United States Patent [19]

Benedict

[11] Patent Number: 4,798,564
[45] Date of Patent: Jan. 17, 1989

[54] DOUBLE BELT TENSIONER

[75] Inventor: Robert B. Benedict, Flint, Mich.

[73] Assignee: General Motors Corporation, Detroit, Mich.

[21] Appl. No.: 95,007

[22] Filed: Sep. 8, 1987

[51] Int. Cl.⁴ ............................................. F16H 7/12
[52] U.S. Cl. .................................. 474/134; 474/135
[58] Field of Search ............... 474/101, 111, 133, 134, 474/135, 109

[56] References Cited

U.S. PATENT DOCUMENTS

| | | | |
|---|---|---|---|
| 2,152,038 | 3/1938 | Gettys | 474/89 |
| 2,609,701 | 9/1952 | Schmitz | 474/133 |
| 3,058,363 | 10/1962 | Unruh | 474/89 |
| 3,216,266 | 11/1965 | Sunnen | 474/134 X |
| 3,362,243 | 1/1968 | Ferguson | 474/113 |
| 3,924,483 | 12/1975 | Walker et al. | 474/117 |
| 3,975,965 | 8/1976 | Speer | 474/135 |
| 4,046,022 | 9/1977 | Henderson | 74/203 |
| 4,299,582 | 11/1981 | Leitner | 474/109 |
| 4,299,583 | 11/1981 | Kraft et al. | 474/110 |
| 4,416,647 | 11/1983 | White, Jr. | 474/134 |
| 4,511,348 | 4/1985 | Witdoek et al. | 474/109 |

*Primary Examiner*—Jerome W. Massie, IV
*Assistant Examiner*—Matthew Smith
*Attorney, Agent, or Firm*—Patrick M. Griffin

[57] ABSTRACT

A single tensioner is used to tension a double belt. A spring biased, swinging primary arm has a secondary arm freely pivoted to the end thereof. One idler pulley on the secondary arm pushes on a run of one of the belts, while another idler pulley pulls on a run of the second belt. Thus, the two idler pulleys can tension both belts simultaneously, and the free pivoting of the secondary arm relative to the primary arm as the primary arm swings compensates for differential belt stretch.

2 Claims, 3 Drawing Sheets

DOUBLE BELT TENSIONER

This invention relates to vehicle belt tensioners in general, and specifically to a belt tensioner that provides tension for two belts simultaneously.

BACKGROUND OF THE INVENTION

It is known to drive all of the various accessories that are mounted to the front of the engine block, such as the power steering pump, the alternator, the air conditioning compressor, and the water pump, with a single, serpentine belt, in the interests of simplicity and cost saving. While such a long belt is particularly subject to stretch over its life, it is possible to maintain continuous tension in the belt with a belt tensioner. These typically include an arm pivoted to swing about one end relative to the engine block, with an idler pulley at the other end that is forcibly pushed into the inside or outside of a run of the belt by a strong spring wrapped around the pivot. A good example of such a tensioner may be seen in the U.S. Pat. No. 4,473,362 to Thomey et al.

There cases where packaging restraints require the use of two different belts, each of which is to be driven from the crankshaft, but which would wind through differing paths. In such case each belt would require a separate tensioner. Using a single tensioner with a double grooved idler pulley would be impractical, since different belts, especially ones of different lengths, would not stretch by equal amounts. The obvious solution of using two tensioners, while workable, would double the cost of keeping the belts in tension, and would also represent a weight penalty.

SUMMARY OF THE INVENTION

The invention provides an economical solution to the problem described above in the form of a single belt tensioner that maintains the proper tension in each belt, and which further compensates for the tendency of the two belts to stretch by differing amounts.

The preferred embodiment of the invention is disclosed in an environment where first and second belts are each driven by a single crankshaft drive pulley, and therefore each belt is disposed in a plane parallel to the other belt. The tensioner includes primary arm that is pivoted at one end to the front of the engine block. A strong tensioner spring or other resilient means operable between the block and the primary arm provides a strong force tending to continually swing the primary arm in one direction relative to the block, counterclockwise in the particular case illustrated. At the other end of the primary arm, a secondary arm is freely pivoted intermediate its two ends, in a general T configuration. There is an idler pulley at each end of the secondary arm, a first idler pulley end engageable with the outside of a run of the first belt, and, a second idler pulley end engageable with the inside of a run of the second belt.

This relative configuration of the single tension spring and the two idler pulleys allows the single tension spring to push the first idler pulley into the first belt run while simultaneously pulling the second idler pulley into the second belt run. Thus, each belt is tensioned with the single spring. This is an advantage, since it is the spring and its mounting that represents the majority of the expense and weight in the tensioner. As each belt stretches, the primary arm swings as the first idler pulley is pushed farther into the first belt run and the second idler pulley is concurrently pulled farther into the second belt run. If there is a differential in the amount of stretch of the two belts, it is compensated for by the fact that the secondary arm can pivot freely in either direction relative to the primary arm simultaneously as the primary arm swings relative to the block.

It is, therefore, a general object of the invention to continually tension two different belts with a single resilient means.

It is another object of the invention to provide such a tensioner in which a primary arm is biased by the resilient means to swing in one direction relative to the vehicle and is pivoted at the other end to a secondary arm intermediate first and second idler pulleys on the secondary arm, with the first idler pulley being continually pushed into a run of the first belt and with the second idler pulley continually pulled into a run of the second belt.

It is yet another object of the invention to provide such a tensioner for two belts which are driven in different planes by the engine crankshaft, and in which the idler pulleys on the secondary arm are offset from one another so as to be engageable with each belt.

DESCRIPTION OF THE PREFERRED EMBODIMENT

These and other objects and features of the invention will appear from the following written description, and from the drawings, in which.

Figure 1:
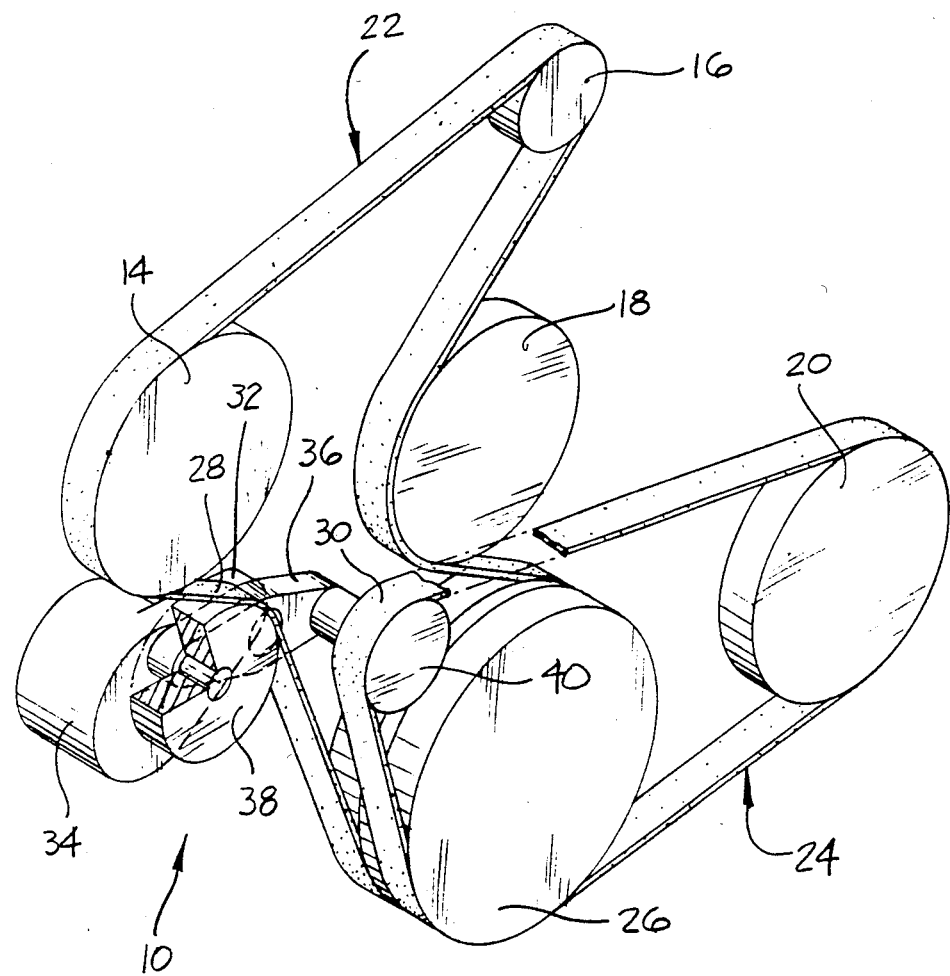
FIG. 1 is a perspective view of the two belts and a preferred embodiment of the tensioner of the invention.
Figure 2:
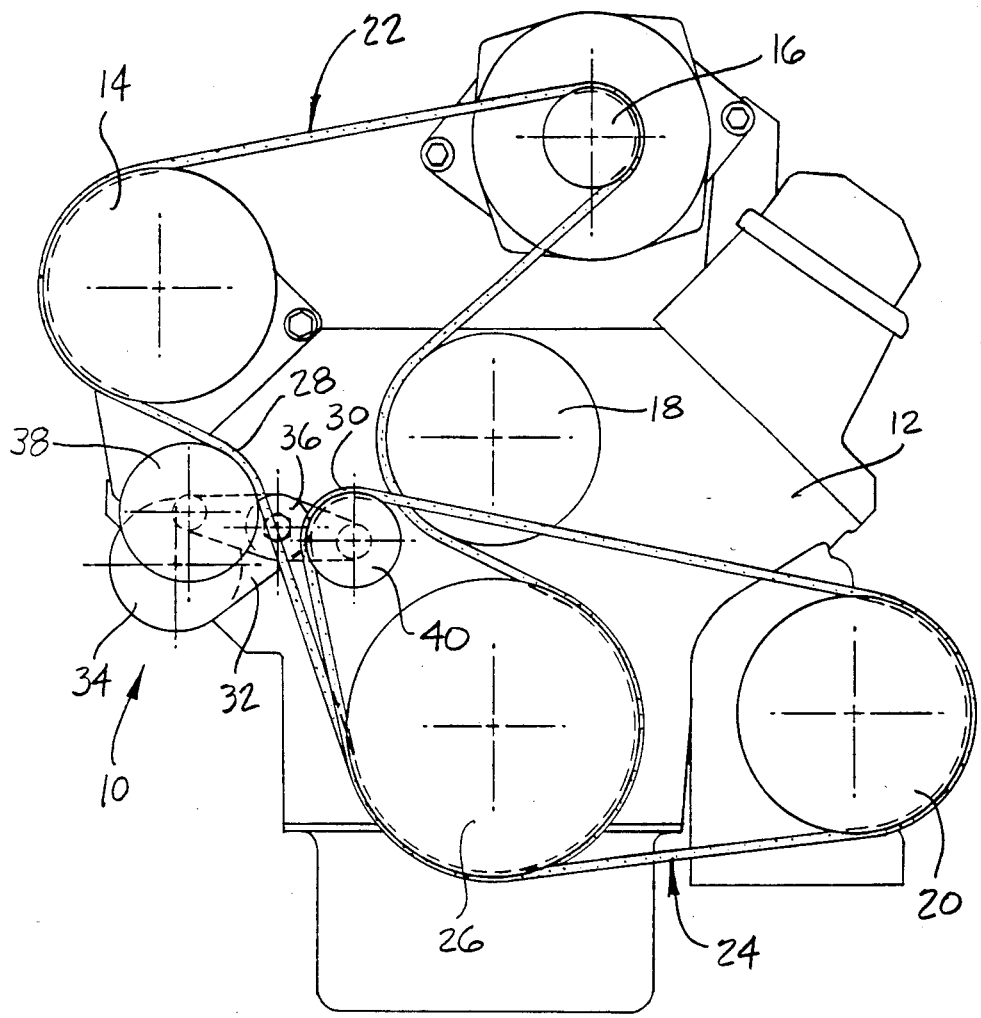
FIG. 2 is a front view of the engine block, the two belts, and the a preferred embodiment, showing the location of the block accessories schematically.

Referring first to FIGS. 1 and 2, the preferred embodiment of the belt tensioner of the invention, designated generally at 10, is mounted to a vehicle engine block 12, specifically to the front thereof. It should be kept in mind that while engine block 12 would be mounted transversely, so that the tensioner 10 would actually be located at the side of the engine compartment, it is still considered as being mounted to the front of block 12. Also mounted at several locations to the front of block 12 are the various typical engine driven accessories, which are indicated schematically only, including power steering pump 14, alternator 16, water pump 18, and air conditioning compressor 20. The power steering pump 14, alternator 16, and water pump 18, are driven by a first belt, designated generally at 22, while compressor 20, is driven by a second belt, designated generally at 24. Both belts 22 and 24 are powered by an engine crankshaft pulley 26, which is double grooved, and so drives the two belts 22 and 24 in different, but parallel, planes. Although the two belts 22 and 24 follow different paths and are disposed in different planes, the run of belt 22 between power steering pump 14 and crankshaft pulley 26, designated at 28, and the top run of belt 24 between compressor 20 and crankshaft pulley 26, designated at 30, are near one another, which fact is used to advantage in the invention. Both belts 22 and 24 are subject to stretch, and the amount of stretch that they undergo will likely differ over time, given their differing lengths and differing power transmission requirements. The tensioner 10 of the invention continually tensions both belts 22 and 24 at once, and automatically compensates for their differential in stretch.

Still referring to FIGS. 1 and 2, the preferred embodiment of the tensioner of the invention 10 includes a primary arm 32 that is pivoted at one end to the front of the engine block 12. Conveniently, primary arm 32 would be pivoted to block 12 coaxial to a housing 34 fixed directly or indirectly to block 12, and a strong tensioner spring or other resilient means hooked between housing 34 and arm 32 provides a strong tensioning force tending to continually swing arm 32 in one direction, counterclockwise from the perspective of FIG. 2. A secondary arm 36 is freely pivoted near its center to the other end of primary arm 32, generally forming a T. Each end of secondary arm 36 includes a free spinning idler pulley, specifically a first idler pulley 38 and a second idler pulley 40. Pulleys 38 and 40 are of conventional design, and would be pivoted on conventional bearings, not shown. As best seen in FIG. 1, pulleys 38 and 40 are offset from one another an amount equal to the planar separation of the two belts 22 and 24. Therefore, first pulley 38 is engageable with the outside of first belt run 28, second idler pulley 40 is engageable with the inside of second belt run 30. Given this relative configuration, it will be understood that, as primary arm 32 is swung forcibly counterclockwise, the first idler pulley 38 will be pushed into the first belt run 28, while simultaneously the second idler pulley 40 will be pulled into the second belt run 30. Each belt 22 and 24 is continuously tensioned with the single spring that biases primary arm 32, which is a cost and weight advantage, since the spring and associated mechanisms are generally the heaviest and costliest component of a tensioner.

Figure 3:
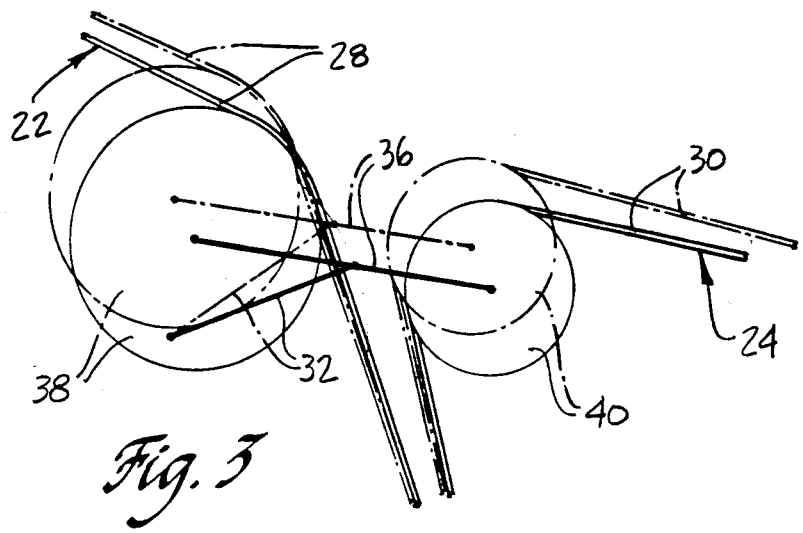
FIG. 3 is a schematic view illustrating the motion of the tensioner of the invention when each belt stretches substantially the same amount.
Figure 4:
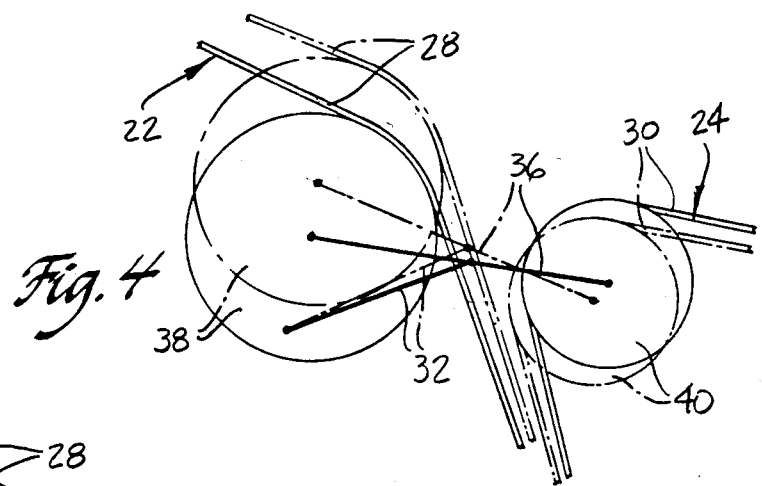
FIG. 4 is a schematic view illustrating the motion of the tensioner of the invention when the first belt stretches, but the second belt does not.
Figure 5:
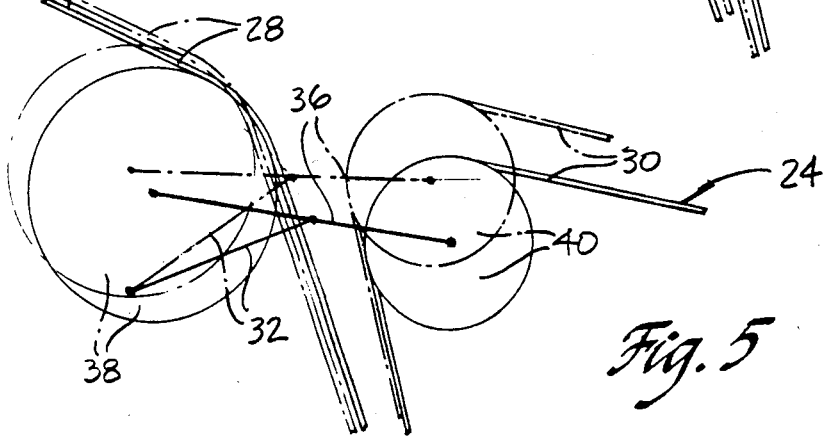
FIG. 5 is a schematic view illustrating the motion of the tensioner of the invention when the second belt stretches, but the first belt does not.

Referring next to FIGS. 3 through 5, the operation of the invention 10 when belts 22 and 24 stretch over time is illustrated. The original positions are shown diagrammatically in solid lines, and the shifted or moved positions in dotted lines. FIG. 3 illustrates the case where each belt 22 and 24 stretches substantially the same amount. As this occurs, the primary arm 32 swings counterclockwise and up, and the secondary arm 36 translates essentially parallel to its original position as first idler pulley 38 is pushed farther into first belt run 28 and second idler pulley 40 is concurrently pulled farther into second belt run 30. As noted above, however, belts 22 and 24 are not particularly likely to stretch to the same degree. An additional advantage of the invention is that it compensates automatically for that differential stretch. FIG. 4 illustrates the situation where first belt 22 has stretched, and second belt 24 has not, or only to a slight degree. As primary arm 32 has swung counterclockwise and up, first pulley 38 has been pushed farther into and along the outside of first belt run 28, but the second pulley 40 has simply rolled downwardly along the inside of second belt run 30. Consequently, rather than translating as it did in FIG. 3, secondary arm 36 has moved up and twisted clockwise down freely about its center pivot point at the end of primary arm 32. The converse situation is illustrated in FIG. 5, where first belt 22 has not stretched significantly, but second belt 24 has. Now, as primary arm 32 has swung counterclockwise and up, second pulley 40 has been pulled farther into the second belt run 30, and the first pulley 38 has rolled up and along the outside of first belt run 28. Consequently, secondary arm 36 has moved up an twisted clockwise. Thus, the secondary arm 36 can pivot or twist freely in either direction relative to the primary arm 32 as the primary arm 32 swings, compensating for differential stretch between the two belts 22 and 24.

Variations of the preferred embodiment 10 may be made within the spirit of the invention. For example, it would be possible to offset pulleys 38 and 40 from one another by placing them on different sides of the secondary arm 36, In the case where belts 22 and 24 were not in different planes, then pulleys 38 and 40 would not have to be offset from one another. The idler pulleys 38 and 40 could conceivably be provided by sliding surfaces at the ends of the secondary arm 36, although a free spinning pulley clearly provides less friction. While primary arm 32 is pivoted near the center of secondary arm 36 it could be pivoted closer to one of the pulleys 38 or 40 if desired. Therefore, it will be understood that the invention is not intended to be limited to just the embodiment disclosed.

The embodiments of the invention in which an exclusive property or privilege is claimed are defined as follows:

1. In a vehicle in which first and second belts driven from the vehicle engine are used to power accessories mounted at varied locations to the vehicle, so that the belts wind through differing paths with differing lengths, and are therefore subject to differing amounts of stretch, a single belt tensioner to continuously maintain the proper tension in each belt, said tensioner comprising, a primary arm pivoted at one end of said vehicle, a single resilient means operable between said vehicle and said primary arm to continually forcibly swing said arm about said one end in one direction, a secondary arm freely pivoted intermediate its two ends to the other end of said primary arm, a first idler pulley on said secondary arm engageable with the outside of a run of said first belt, and, a second idler pulley on said secondary arm engageable with the inside of a run of said second belt, whereby said single resilient means will push said first idler pulley into said first belt run while simultaneously pulling said second idler pulley into said second belt run, thereby tensioning each of said belts simultaneously, with any differential in the stretching of said two belts being compensated for automatically by the secondary arm pivoting relative to the primary arm in either direction so that either pulley may move up or down from its original position as said primary arm swings.

2. In a vehicle in which first and second belts driven in different planes are used to power accessories mounted at varied locations to the vehicle, so that the belts wind through differing paths with differing lengths, and are therefore subject to differing amounts of stretch, a single belt tensioner to continuously maintain the proper in each belt, said tensioner comprising, a primary arm pivoted at one end to said vehicle, a single resilient means operable between said vehicle and said primary arm to continually forcibly swing said arm about said one end in one direction, a secondary arm freely pivoted intermediate its two ends to the other end of said primary arm, a first idler pulley on said secondary arm engageable with the outside of a run of said first belt, and, a second idler pulley on said secondary arm offset from said first idler pulley so as to be engageable with the inside of a run of said second belt, whereby said single resilient means will push said first idler pulley into said first belt run while simultaneously pulling said second idler pulley into said second belt run, thereby tensioning each of said belts simultaneously, with any differential in the stretching of said two belts being compensated for automatically by the secondary arm pivoting relative to the primary arm in either direction so that either pulley may move up or down from its original position as the primary arm swings.

* * * * *